US011881624B2

(12) United States Patent
Enescu et al.

(10) Patent No.: US 11,881,624 B2
(45) Date of Patent: Jan. 23, 2024

(54) WIRELESS COMMUNICATION SYSTEM AND METHOD

(71) Applicant: NXP USA, Inc., Austin, TX (US)

(72) Inventors: Andrei Alexandru Enescu, Bucharest (RO); Wim Joseph Rouwet, Austin, TX (US)

(73) Assignee: NXP USA, Inc, Austin, TX (US)

( * ) Notice: Subject to any disclaimer, the term of this patent is extended or adjusted under 35 U.S.C. 154(b) by 128 days.

(21) Appl. No.: 17/443,601

(22) Filed: Jul. 27, 2021

(65) Prior Publication Data

US 2022/0085514 A1 Mar. 17, 2022

(30) Foreign Application Priority Data

Sep. 11, 2020 (RO) ................................ a 202000575

(51) Int. Cl.
*H01Q 3/46* (2006.01)
*H01Q 15/02* (2006.01)
*H01Q 19/06* (2006.01)

(52) U.S. Cl.
CPC ............... *H01Q 15/02* (2013.01); *H01Q 3/46* (2013.01); *H01Q 19/062* (2013.01)

(58) Field of Classification Search
CPC .... H01Q 19/06; H01Q 19/062; H01Q 19/067; H01Q 3/44; H01Q 3/46
See application file for complete search history.

(56) References Cited

U.S. PATENT DOCUMENTS

| | | | | |
|---|---|---|---|---|
| 8,797,211 | B2 | 8/2014 | Valdes-Garcia | |
| 10,236,574 | B2 * | 3/2019 | Chen | H02J 50/23 |
| 10,720,712 | B2 * | 7/2020 | Foo | H01Q 1/36 |
| 2019/0067826 | A1 | 2/2019 | Achour et al. | |
| 2021/0036753 | A1 * | 2/2021 | Lee | H01Q 21/28 |
| 2021/0234592 | A1 * | 7/2021 | Ashrafi | H04B 7/0617 |

OTHER PUBLICATIONS

Ding et al.: "3D field-shaping lens using all-dielectric gradient refractive index materials", Scientific Reports vol. 7, Article No. 782 (2017), published Apr. 10, 2017, weblink: https://www.nature.com/articles/s41598-017-00681-z, pp. 1-8.
Hashemi et al.: "Electronically-Controlled Beam-Steering through Vanadium Dioxide Metasurfaces", Sci Rep. 2016; 6: 35439, PMCID: PMC5064393, Published online Oct. 14, 2016. doi: 10.1038/srep35439, website: https://www.ncbi.nlm.nih.gov/pmc/articles/PMC5064393/, pp. 1-10.
Jiang et al.: "Low-DC Voltage-Controlled Steering-Antenna Radome Utilizing Tunable Active Metamaterial", IEEE Transactions on Microwave Theory and Techniques, vol. 60, Issue: 1, Jan. 2012, IEEE, Nov. 16, 2011, pp. 170-178.
Khawaja et al.: "Coverage Enhancement for mmWave Communications using Passive Reflectors", website: https://arxiv.org/pdf/1803.08250.pdf, May 25, 2018, pp. 1-6.
(Continued)

*Primary Examiner* — Daniel Munoz

(57) ABSTRACT

A wireless communication system include user equipment which includes a receive antenna for receiving mmWave signals from a base station transmitter. The system also includes a barrier configured to focus electromagnetic radiation carrying the mmWave signals onto the receive antenna of the user equipment.

16 Claims, 6 Drawing Sheets

(56) References Cited

OTHER PUBLICATIONS

Michishita et al.: "Metamaterial radome composed of negative refractive index lens for mobile base station antennas", 2014 International Conference on Advanced Technologies for Communications (ATC 2014), Oct. 15-17, 2014, Hanoi, Vietnam, pp. 60-63.
NXP: "Layerscape Access LA1200 Programmable Baseband Processor", downloaded from https://www.nxp.com/products/processors-and-microcontrollers/arm-processors/layerscape-processors/layerscape-access-la1200-programmable-baseband-processor:LA1200, on Jul. 26, 2021, pp. 1-2.
Ozis et al.: "Metamaterials for Microwave Radomes and the Concept of a Metaradome: Review of the Literature", vol. 2017, Article ID 1356108 , website: https://doi.org/10.1155/2017/1356108, Hindawi, International Journal of Antennas and Propagation, Published Jul. 20, 2017, pp. 1-13.
Remcom: "Design and Simulation of 28 GHz Beamforming System and Antenna Array for 5G Network Base Stations", website: https://www.remcom.com/examples/2019/3/19/design-and-simulation-of-28-ghz-beamforming-system-and-antenna-array-for-5g-network-base-stations, Mar. 2019, pp. 1-11.
translatorscafe.com, "Effective Antenna Aperature Calculator", downloaded from https://www.translatorscafe.com/unit-converter/en-US/calculator/effective-antenna-aperture/ on Jul. 26, 2021, pp. 1-6.
Wikipedia: "Electromagnetic metasurface", downloaded from https://en.wikipedia.org/wiki/Electromagnetic_metasurface, on Jul. 26, 2021, pp. 1-5.

* cited by examiner

WIRELESS COMMUNICATION SYSTEM AND METHOD

CROSS-REFERENCE TO RELATED APPLICATIONS

This application claims the priority under 35 U.S.C. § 119 of Romania application no. A202000575, filed on 11 Sep. 2020, the contents of which are incorporated by reference herein.

BACKGROUND

The present specification relates to a wireless communication system and method.

Modern wireless and wireline communication standards rely on use of higher frequency (mmWave) bands which are prone to high amounts of path and barrier losses. As a result, techniques to improve the link budget are required.

Existing mmWave systems use physically small antenna arrays to balance (array) antenna gain, device portability and cost. Antenna arrays can support beamforming to direct energy between receiver and transmitter devices, but the beam widths are generally still wide and a lot of energy can be lost in transmission.

In known Fixed Wireless Access systems, the client is often located near a barrier (e.g. behind a wall and/or window) inside the customer premises. In traditional systems, this barrier can impose losses and can be decremental to the link performance. Moreover, an indoor receive antenna may not allow Line Of Sight communications with the base station, thus causing even more power loss.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a wireless communication system comprising:

user equipment comprising a receive antenna for receiving mmWave signals from a base station transmitter; and a barrier configured to focus electromagnetic radiation carrying said mmWave signals onto the receive antenna of the user equipment.

According to another aspect of the present disclosure, there is provided a wireless communication method comprising:

providing user equipment comprising a receive antenna;

providing a barrier configured to focus electromagnetic radiation carrying mmWave signals onto the receive antenna of the user equipment; and receiving mmWave signals at the user equipment by using the barrier to focus electromagnetic radiation carrying the mmWave signals onto the receive antenna of the user equipment, wherein the electromagnetic radiation carrying the mmWave signals is transmitted by a base station.

The barrier may be a window for a building. The use of a window in this way can provide a convenient platform for providing means for focusing the electromagnetic radiation carrying the mmWave signals onto the receive antenna of the user equipment. The window may be a conventional window that has been configured aftermarket to provide the focusing function, or may alternatively be pre-configured to include features for providing the focusing function at the time that it is sold.

The barrier may include an array of elements. Each element may be configured to refract the electromagnetic radiation carrying the mmWave signals by a respective angle, for collectively focusing the electromagnetic radiation carrying the mmWave signals onto the receive antenna of the user equipment. The array may be a two dimensional array. The array may be a regular array (e.g. a rectangular, square, oblong or hexagonal array).

At least some of the elements may be located on a surface of the window. The elements may be applied to a conventional window pane after market, or the window (or the glass pane thereof) may be provided already with the array of elements at the time it is sold.

At least some of the elements may be passive elements.

At least some of the elements may be active elements. This can allow for tuning of the focusing effect, e.g. for compatibility with the location of the receive antenna of the user equipment and/or the interior space of the building in which it is located. In some embodiments, the active elements may include a varactor for tuning a refraction angle applied by each active element to the electromagnetic radiation carrying the mmWave signals.

A surface area of the barrier may be larger than a surface area of the receive antenna of the user equipment. This can allow the effective aperture of the system, for receiving the electromagnetic radiation carrying the mmWave signals to be increased compared to simple reception of the electromagnetic radiation carrying the mmWave signals at the receive antenna of the user equipment absent the barrier.

The user equipment may be a fixed wireless access modem.

The user equipment may be a mobile communications device such as a mobile telephone, tablet or watch.

The wireless communication system may further include the base station.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
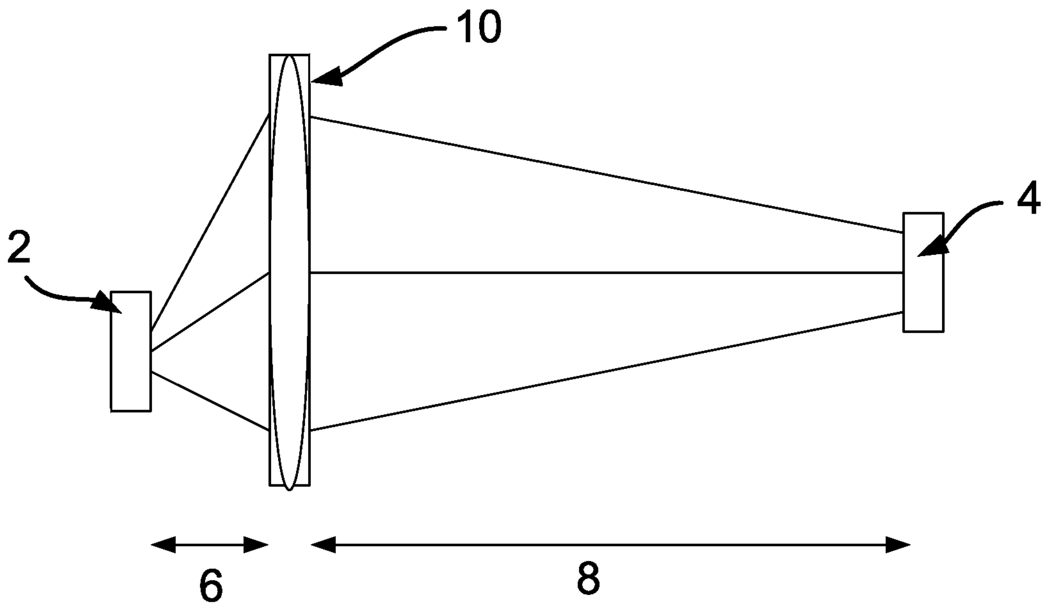
FIG. 1 shows an arrangement of a transmitter node, window and receiver node according to an embodiment of this disclosure.

FIG. 1 shows an arrangement of a transmitter node 4, a barrier 10 and a receiver node 2 according to an embodiment of this disclosure. Collectively, the features shown in FIG. 1 may form a Fixed Wireless Access system.

The transmitter node 4 may be a base station. The base station may operate in accordance with the 5G telecommunications standard.

The receiver node 2 may comprise user equipment installed or located in a customer premises. The premises may be domestic or commercial. The receiver node 2 may operate in accordance with the 5G telecommunications standard. The receiver node 2 may be configured to receive signals from the transmitter node 4 and relay them locally (e.g. to other devices located within the customer premises) using a LAN or WLAN. The receiver node 2 may comprise a fixed receiver (e.g. a fixed wireless access modem) installed in the customer premises, or may alternatively comprise a mobile client device such as a mobile telephone.

The receiver node 2 may comprise a receive antenna, as will be described in more detail below. The receiver node 2 may also have transmit functionality (e.g. using the receive antenna as a transmit antenna). For brevity, the present disclosure will be describe the operation of the Fixed Wireless Access system in the context of signals transmitted by the transmitter node 4 and received by the receiver node 4, but it will be appreciated that the principles described herein may also apply to signals transmitted by the receiver node 4 and received by the transmitter node 4.

The barrier 10 may typically comprise some part of the structure (building) of the customer premises. In the embodiments described herein, the barrier 10 comprises a window, although it will be appreciated that the barrier 10 may comprise some other part of the building (e.g. door, wall etc.).

As can be seen in FIG. 1, the transmitter node 4 transmits mmWave signals to the receiver node 2. The barrier 10 is located in between the transmitter node 4 and the receiver node 2. Accordingly, conventionally, the barrier may at least partially block or attenuate the magnetic radiation carrying the mmWave signals. In accordance with embodiments of this disclosure, the barrier 10 configured to focus the electromagnetic radiation carrying the mmWave signals onto the receive antenna of the receiver node 2. Thus the barrier may be considered to act as a lens. In this way, reception of the mmWave signals at the receiver node 2 may be enhanced compared to conventional Fixed Wireless Access systems.

As shown in FIG. 1, typically, the receiver node 2 is located close (e.g. of the order of a few meters) to the barrier 10, while the transmitter node 4 (e.g. base station) may be located relatively far away from the customer premises and the barrier (e.g. window) thereof. Hence the distance 6 shown in FIG. 1 is generally much shorter than the distance 8.

Figure 2:
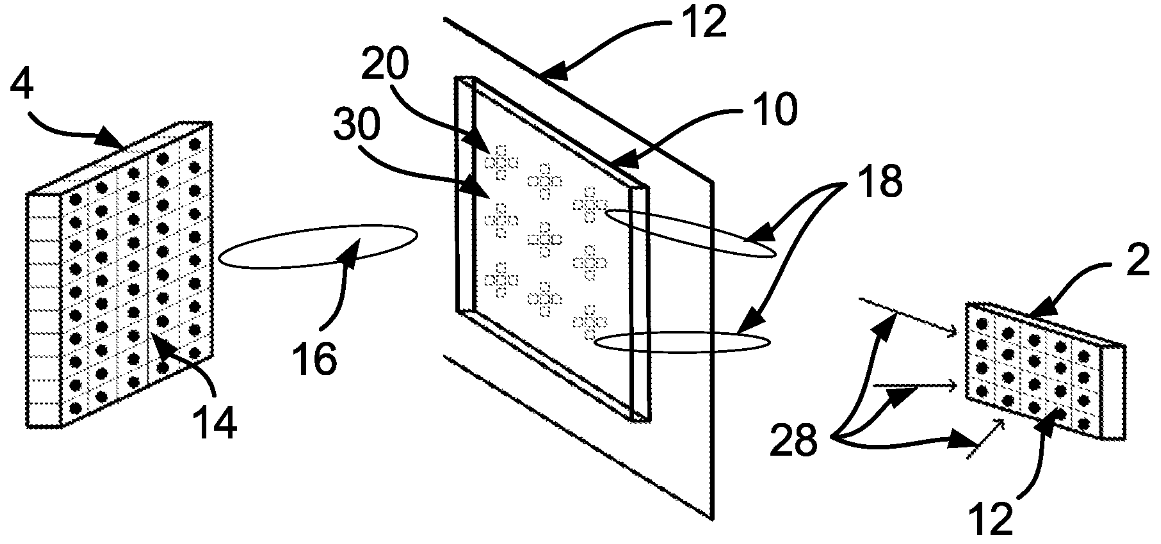
FIG. 2 shows the arrangement of FIG. 1 in more detail according to an embodiment of this disclosure.

FIG. 2 shows the arrangement of FIG. 1 in more detail. In this example, the barrier 10 comprises a window located in a wall 12 of the customer premises. The window comprises at least one glass pane 30. The window includes an array of elements 20. The elements 20 are each configured to refract the electromagnetic radiation 16 carrying the mmWave signals transmitted by the transmit transmitter node 4 by a respective angle. This can allow the elements 20 of the array collectively to focus the electromagnetic radiation 16 onto the receive antenna of the receiver node 2. The refracted radiation is denoted using reference numeral 18 in FIG. 2. As illustrated by the arrows labelled 28 in FIG. 2, the refracted radiation 18 converges on the receive antenna of the receiver node 2.

The elements 20 may be arranged in a regular array, such as a rectangular (e.g. square or oblong) array. The elements 20 may be applied to a surface of the pane 30 or panes 30. In some examples, the window may be sold with the elements 20 in situ. However, it is also envisaged that the elements 20 may be applied to an existing barrier 10 (e.g. glass window pane 30). The elements 20 may be considered to form a meta surface for focusing the electromagnetic radiation 16 transmitted by the transmitter node 4 onto the receive antenna of the receiver node 2. Examples of suitable meta-surfaces that may be used are described at:

https://en.wikipedia.org/wiki/Electromagnetic_metasurface;

https://www.ncbi.nlm nih.gov/pmc/articles/PMC5064393/; and

E. Öziş, A. V. Osipov, T. F. Eibert, Metamaterials for Microwave Radomes and the Concept of a Metaradome: Review of the Literature, the content of which are incorporated herein by reference.

The transmit antenna of the transmitter node 4 may be considered to be made up of a plurality of transmit antenna elements 14. Similarly, the receive antenna of the receiver node 2 may be considered to be made up of a plurality of receive antenna elements 12.

Figure 3:
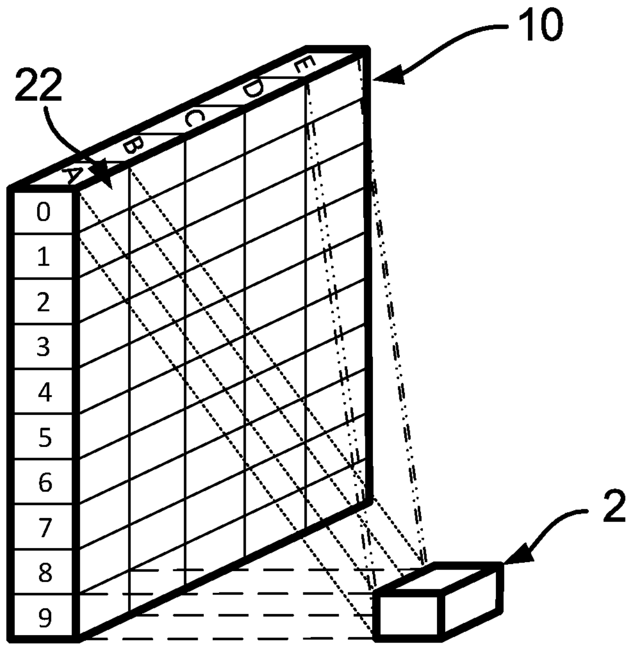
FIG. 3 shows a window and receiver node according to an embodiment of this disclosure.

FIG. 3 shows a barrier 10 (e.g. window) and receiver node 3 according to an embodiment of this disclosure. In FIG. 3, the window and the elements 20 thereof may be considered to form an array of sub-arrays 22 (comprising sub-arrays denoted (A-E; 0-9)). FIG. 3 also illustrates how each element in the array may refract the electromagnetic radiation 16 carrying the mmWave signals transmitted by the transmit transmitter node 4 by a respective angle, thereby to focus the electromagnetic radiation 16 onto the receiver node 2.

In order to configure the Fixed Wireless Access system for correct focusing of the electromagnetic radiation 16 onto the receive antenna of the receiver node 2, the spatial relationship between the barrier 10 and the receive antenna of the receiver node 2 must be established. This may be achieved in a number of ways. In one example, the focus point provided by the elements 20 may be known, and the receive antenna of the receiver node 2 may be placed at or near to this point within the customer premises. In another example, the location of the focus point may be configurable within a range of locations relative to the location of the barrier 10 including the elements 20. This may allow the user some flexibility in the placement of the receive antenna of the receiver node 2.

Figure 4:
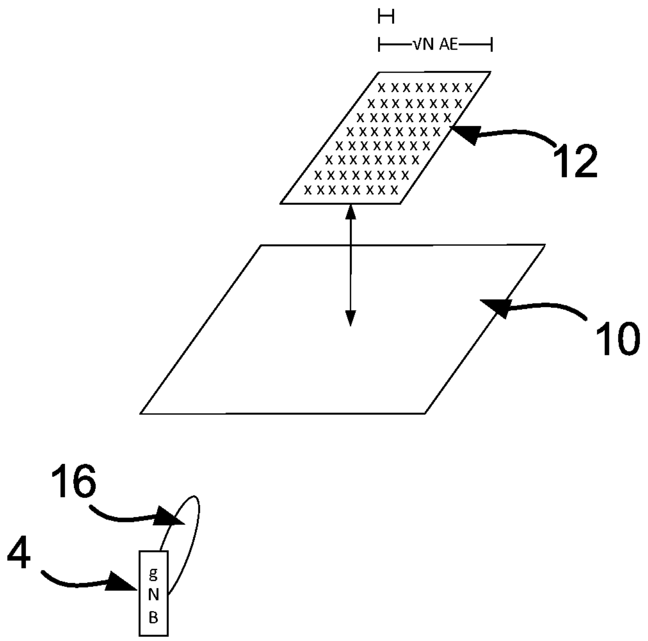
FIG. 4 shows an arrangement of a transmitter node, window and receiver node according to an embodiment of this disclosure.
Figure 5:
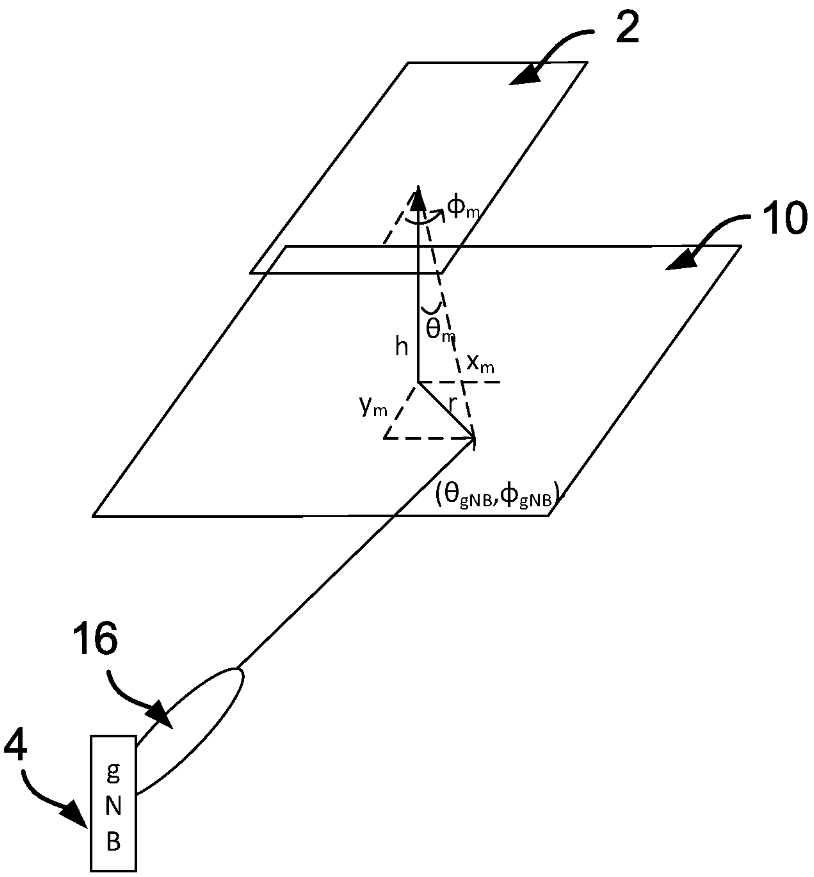
FIG. 5 shows an arrangement of a transmitter node, window and receiver node according to an embodiment of this disclosure.
Figure 6:
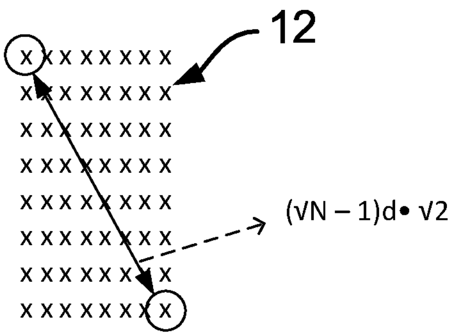
FIG. 6 shows a receiver node antenna array according to an embodiment of this disclosure.

FIGS. 4 and 5 show an arrangement of a transmitter node 4, barrier 10 (e.g. window) and receiver node 2 according to an embodiment of this disclosure. FIG. 6 shows a receiver node antenna array according to an embodiment of this disclosure.

In the arrangement of FIG. 4, it is assumed that:

the receive antenna array of the receiver node 2 is a plane parallel to the window surface;

- the receive antenna array comprises a 2-D array of N elements ($\sqrt{N}\times\sqrt{N}$ elements), spaced at $d\leq(\lambda/2)$, where $\lambda$ is a wavelength of the electromagnetic radiation transmitted by the transmitter node 4;
- The receive antenna array of the receiver node 2 is in the far field of the window acting as a radiation source.

For these assumptions to hold true, the following far-field conditions need to apply (where h is the distance between the distance between the window and the receive antenna array of the receiver node 2):

$$h >> \frac{2(\text{max antenna dimension})^2}{\lambda}$$

$$h >> \frac{2\cdot\left(\sqrt{N}\cdot\frac{d}{2}\right)^2}{4\lambda} \text{ or}$$

$$\left(\text{given } d=\frac{\lambda}{2}\right)$$

$$h >> \frac{2\cdot N\cdot\left(\frac{\lambda}{2}\right)^2}{4\lambda} \text{ or}$$

$$h >> \frac{N\cdot\lambda}{8}$$

These assumptions do hold true if, for example, $\lambda$=1 cm, N=64, h>>8 cm (these example values are consistent with a typical mmWave system).

In accordance with embodiments of this disclosure, the window and the elements 20 thereof act as a series of refractive elements, each element being configured to re-direct the electromagnetic radiation carrying the mmWave signals onto the receive antenna of the receiver node 2. The refraction coefficient F of each element for achieving the focusing affect depends upon the transmitter node 4 (e.g. gNB base station) angle with respect to the window and upon the coordinates of each element 20 within the window. The coordinates of an $m^{th}$ element 20 within the window may be denoted $x_m$, $y_m$, as shown in FIG. 5.

The problem can be defined in two ways, according to the size of the window refractive aperture. While these approaches can provide the same benefits in terms of link budget enhancement, the way to leverage them are generally different. The first approach is a narrow-band beamforming approach and the second approach is a wide-band beamforming approach.

Narrow-band beamforming.

The multiple rays incident at the receive CPE antenna array must have a small delay spread, e.g. the difference between the earliest ray and the latest ray must be much smaller than the inverse of the bandwidth:

$$\frac{r_{max}-r_{min}}{c} << \frac{1}{B}$$

where c stands for the speed of light, B denotes the bandwidth and r is distance of the $m^{th}$ element 20 from the receive antenna of the receiver node 2.

As a consequence, there are two conditions that must be fulfilled by the setup where multiple incidence points occur in the Fixed Wireless Access system: at the refraction point (of the window) and on the receive point (of the antenna array).

Condition 1: At the receive antenna array.

The first condition, with reference to FIG. 6, is that the largest delay across the surface of the antenna array of the receiver node 2 should be much smaller than the system bandwidth B, i.e.:

$$\frac{(\sqrt{N}-1)d\sqrt{2}}{c} << \frac{1}{B} \text{ where } d=\frac{\lambda}{2}$$

$$\frac{(\sqrt{N}-1)\sqrt{2}\cdot\frac{\lambda}{2}}{c} << \frac{1}{B} \text{ or } \frac{\sqrt{N}-1}{\sqrt{2}}\cdot\frac{1}{F} << \frac{1}{B}$$

This condition holds true for F=28 GHz, B=1 GHz, and N=64 (again, these example values are consistent with a typical mmWave system), where F is a frequency of the electromagnetic radiation transmitted by the transmitter node 4.

Condition 2: At the window.

The second condition is associated with the maximum delay difference that can occur between two refracted rays on the window. This depends on the window aperture size and the distance h between the window and the receive antenna array.

In this example, a rectangular refractive aperture on the window with dimensions L×L is assumed. Then it can easily be shown that the maximum possible delay between two refracted waves is the one between the closest point on the window with respect to the receive antenna array and the farthest one. This typically means that the difference is:

$$\frac{\sqrt{L^2+h^2}-h}{c} << \frac{1}{B}$$

For a h=20 cm, B=1 GHz, L would thus be constrained below 3 cm, on a delay spread around 300 ns.

In the narrow-band beamforming case, it may be assumed that the multiple incoming rays have the substantially same magnitude, substantially the same absolute delays and different phases. In this case, a simple beamformer that applies phase shifts and combines the ray may be used.

The received signal at the receive antenna of the receiver node 2 may be defined as:

$$r(t, \phi_{gNB}, \vartheta_{gNB}) = \sum_{k=0}^{\sqrt{N}-1}\sum_{p=0}^{\sqrt{N}-1} W_{k,p}\left(\int_0^{\pi}\int_0^{2\pi}\Gamma(\theta, \phi, \theta_{gNB}, \phi_{gNB}) e^{-j\frac{2\pi}{\lambda}(kdsin(\vartheta)cos(\phi)+pdsin(\vartheta)sin(\phi))}d\theta d\phi\right)s(t)$$

or:

$$r(t, \phi_{gNB}, \vartheta_{gNB}) = \sum_{k=0}^{\sqrt{N}-1}\sum_{p=0}^{\sqrt{N}-1} W_{k,p}\left(\int_0^{\pi}\int_0^{2\pi}\Gamma(\theta, \phi, \theta_{gNB}, \phi_{gNB}) e^{-j2\pi sin(\vartheta)(kcos(\phi)+psin(\phi))}d\theta d\phi\right)s(t)$$

where:

- ($\theta_{gNB}$, $\theta_{gNB}$) denotes 3 dimensional angle the angle between the window and the transmitter node 4 as shown in FIG. 5 (this is assumed to be constant across the surface of the window);

$\vartheta_{gNB}$ is the elevation angle under which the transmitter node 4 is seen, defined from a coordinate system placed on the barrier (similarly, $\phi_{gNB}$ is the azimuth angle);

t is time;

$W_{k,p}$ the antenna weight of the $m_{th}$ antenna element 20; and s(t) is the transmitted signal (which may typically be a wide-band signal (e.g. as wide as 1 GHz)).

Here, the antenna element weights $W_{k,p}$ should be evaluated correctly.

In the above formula $\Gamma(\theta,\phi\theta_{gNB},\phi_{gNB})$ is the directive function of the window lens.

Based on spatial filtering theory, the weights $W_{k,p}$ may be chosen to ensure a spatially matched filter, matched to spatial signature $\Gamma(\theta_0)$.

In this example, it is assumed that $\Gamma(\theta_0)$ may be digitized into a finite number of elements:

$$r(t,\phi_{gNB},\vartheta_{gNB}) = \sum_{k=0}^{\sqrt{N}-1}\sum_{p=0}^{\sqrt{N}-1}\sum_{m=0}^{M} W_{k,p}\,\Gamma(\theta_m,\phi_m,\theta_{gNB},\phi_{gNB})s(t)e^{-j2\pi sin(\vartheta_m)(kcos(\phi_m)+psin(\phi_m))}$$

where $$\theta_m = a\cos\frac{h}{\sqrt{(h^2+x_m^2+y_m^2)}} \text{ and } \phi_m = a\tan\frac{y_m}{x_m}$$

Thus:

$$r(t,\phi_{gNB},\vartheta_{gNB}) = \sum_{k=0}^{\sqrt{N}-1}\sum_{p=0}^{\sqrt{N}-1} W_{k,p}F_{k,p}(\theta_{gNB},\phi_{gNB})s(t)$$

where $F_{k,p}(\theta_{gNB},\varphi_{gNB})$ holds the spatial signature:

$$F_{k,p}(\theta_{gNB},\phi_{gNB}) = \sum_{m=0}^{M} W_{k,p}\Gamma(\theta_m,\phi_m,\theta_{gNB},\phi_{gNB})s(t)e^{-j2\pi sin(\vartheta_m)(kcos(\phi_m)+psin(\phi_m))}$$

or:

$$W_{k,p} = F_{k,p}^{*}(\theta_{gNB},\phi_{gNB}) = \sum_{m=0}^{M} \Gamma^{*}(\theta_m,\phi_m,\theta_{gNB},\phi_{gNB})s(t)e^{-j2\pi sin(\vartheta_m)(kcos(\phi_m)+psin(\phi_m))}$$

As such, it may be proven that it is possible to build a spatially matched filter that is capable to capture the refracted energy from the window by using per-element ($W_{k,p}$) weights appropriately.

An alternative non-analytical way to derive the weights is by using an adaptive algorithm, for instance using a reference training signal, since it is not expected that the weights would change.

Wide-band beamforming.

In this case, if one of the previous conditions does not hold regarding the topology of the setup of the Fixed Wireless Access system, then different rays will have different delays.

It may generally not be sufficient to combine phase-offsetted replicas of the received signals. The constructive combining of the signals should have a delay-based beamformer, for example much like a RAKE receiver, employed in CDMA systems.

There are several solutions to cope with this problem.

Multi-Band Receiver

In this case, the receiver node 2 may split the band into multiple (e.g. M) narrower sub-bands, each one handled by a different receiver chain and beamformer. In this case, the narrow-band condition is imposed on each sub-band, rather than on the full band:

$$\frac{\sqrt{L^2+h^2}-h}{c} << \frac{M}{B}$$

For each individual beamformer, over each sub-band, the philosophy of the narrow-band beamformer may be applied, as described above.

OFDM Receiver

In the case of an OFDM receiver, the multiple paths will experience a delay spread. In this case, the receiver will exhibit the following properties:

One single band.

Fixed beamformer, forming a static wide beam, which is wide enough to receive all rays from the window.

Once captured, the multiple staggered rays will be correctly received by the baseband processor, if the delay spread falls within the cyclic prefix, which typically for a millimetre wave system (5G NR) may be 586 ns.

Then the OFDM equalizer can recombine the received paths in the frequency-domain, achieving the same benefit described above in relation to the case of a Multi-band receiver.

RAKE Beamformer

This is the most complex case, in which the beamformer may comprise multiple V-length finite impulse response (FIR) filters (instead of complex weights) whose outputs may then be combined. Then the problem becomes choosing the optimum V*N coefficients of the filter. The problem can still be resolved by imposing a similar (yet more complicated formula) to that described above, or by using an adaptive filter.

Embodiments of this disclosure may, for example, make use of the Metaradomes described in E. Öziş , A. V. Osipov, T F. Eibert, *Metamaterials for Microwave Radomes and the Concept of a Metaradome: Review of the Literature* to implement the elements 2 described herein. Chapter 2 of this paper describes a radome as a protective cover between an antenna and its surroundings. It describes an ideal radome as fully transparent and lossless. A non-ideal radome can exhibit boresight error, caused by refraction of electromagnetic waves at the nonparallel interior and exterior sides of the radome wall with the result that a target is seen at an angularly changed, wrong position with respect to the antenna. The paper then describes the concept of metasurfaces, metasheets and metafilms, depending on whether the layer is penetrable or not, as well as the tunable materials including electrical tuning. It describes Huygens' metasheets that behave like a lens by locally controlling electric and magnetic currents induced on the surface. In chapter 7, this paper then goes on to describe metaradomes that use metasurfaces/sheets/films to improve the electromagnetic response of the enclosed antenna and eliminate the negative effects of conventional microwave radomes. This includes active radomes that are externally controlled. The potential applications described in the paper (see chapter 9) are around radomes with tailored transmission, absorption, and reflection properties to bring additional features and benefits such as correction of phase distortions, reduction of transmission losses, shaping the frequency dependence of the transmission, and making the radome tunable, including the ability of being switched on/off.

Embodiments of this disclosure may use similar metasheet/metafilm concepts, including electronically tunable surfaces to implement the elements 20. Note that embodiments of this disclosure relate to an application/use case which is not considered in E. Öziş, A. V. Osipov, T F. Eibert, *Metamaterials for Microwave Radomes and the Concept of a Metaradome: Review of the Literature.*

Embodiments of this disclosure may be applied for any transceiver or communication system that implements communication through a barrier that can be transformed into an RF lens. Practical use may be limited to mmWave (and higher frequency) systems for which physical dimensions apply. One use case is a mmWave communications (Fixed Wireless Access/FWA) client use, where the device implements a 5G CPE/client modem. In conventional Fixed Wireless Access systems, a mmWave FWA modem is typically located outside of the customer premises with an Ethernet cable feeding into the house for further (WiFi based) distribution of the Internet connection. Embodiments of this disclosure can allow the modem to be placed inside of the customer premises, whereby a barrier (such as a wall, window or roof) is located in between the receive antenna array of the receiver node 2 and the transmitter node 4. According to embodiments of this disclosure, the losses associated with this barrier may be compensated for by the focusing effect described herein and a sufficient link budget may be maintained for successful communications.

Figure 7:
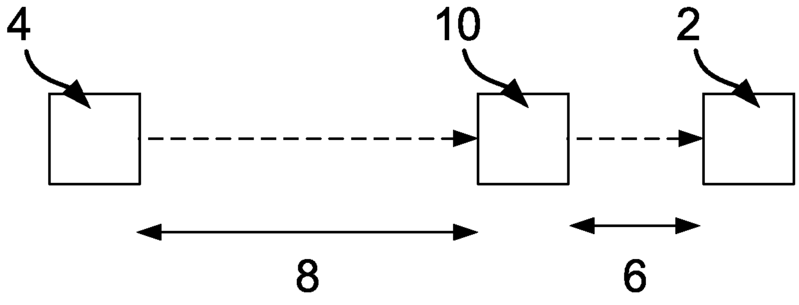
FIG. 7 shows an arrangement of a transmitter node, window and receiver node according to an embodiment of this disclosure.

FIG. 7 again shows an arrangement of a transmitter node 4, barrier 10 (e.g. a window, wall or roof) and a receiver node 2 according to an embodiment of this disclosure. Again, it is assumed that the distance 8 between the transmitter node 4 and the barrier 10 is generally much larger than the distance 6 between the barrier 10 and the receiver node 2.

In the present specific, yet illustrative, example, we assume the following parameters:

- distance between gNB and Lens: 100 meters;
- distance between lens formed by the barrier 10 and the receiver node 2: 1 meter;
- size of barrier (window in this example): 1×1 m;
- operating frequency band: 28 GHz (wavelength ~=1 cm); and
- size of receiver area of the receiver node 2: 0.1×0.1 m (we also assume around 100 Antenna Elements spaced at $\lambda/2$).

As a result, of these parameters, the following assumptions:

- the receiver node 2 operates in the far-field; and
- the incident wave from transmitter node 4 to the receiver node 2 approximates a parallel wave.

Figure 8:
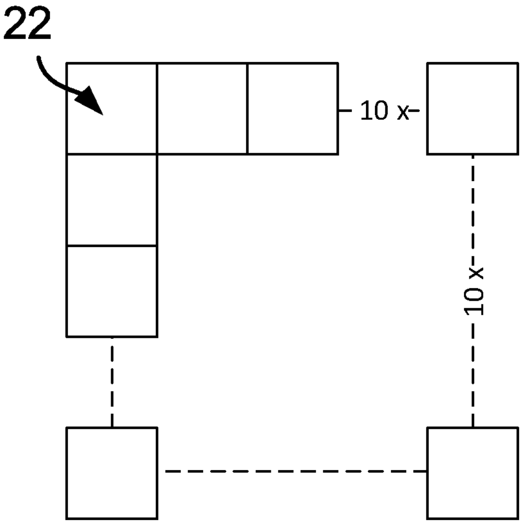
FIG. 8 shows a window divided into a plurality of sub-arrays according to an embodiment of this disclosure.

In this example, the barrier (e.g. window) may be subdivided into sub-arrays 22 as shown in FIG. 8. In the present example, the array of sub-arrays 22 is a 10×10 square array, although this is not essential. In this example, the size of the sub-arrays may be defined as being substantially equal to the size of the receive antenna array of the receiver node 2. This may be done for two reasons:

- the complexity of the system is lower when the number of sub-arrays is smaller; and
- assuming that each sub-array provides a diffraction in a single direction, the lens effect is achieved inter-sub-array, not intra-sub-array.

As a result, in this example, a total sub-array size that is larger than the receive antenna of the receiver node 2 would result in RF energy loss.

Figure 9:
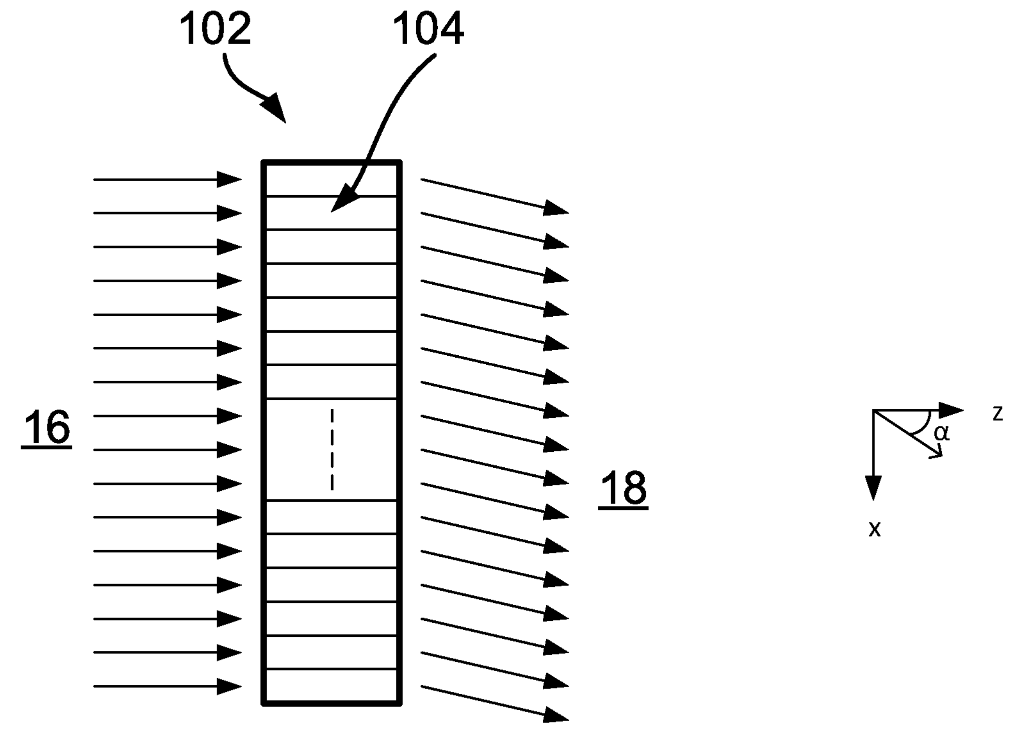
FIG. 9 shows a sub-array according to an embodiment of this disclosure.

As shown in FIG. 9, each sub-array 102 may be implemented by a stacked set of elements 104. Each element in the sub-array shown in FIG. 9 may be considered to be a sub-wavelength resonant cell that implements the metamaterial (e.g. see T. Jiang, Z Wang, D. Li, J. Pan, B. Zhang, J. Huangfu, Y. Salamin, C. Li and L. Ran, "*Low-DC Voltage-Controlled Steering-Antenna Radome Utilizing Tunable Active Metamaterial" IEEE Transactions on microwave theory and techniques*, vol 60, no. 1, January 2012, which is incorporated herein by reference).

Figure 10:
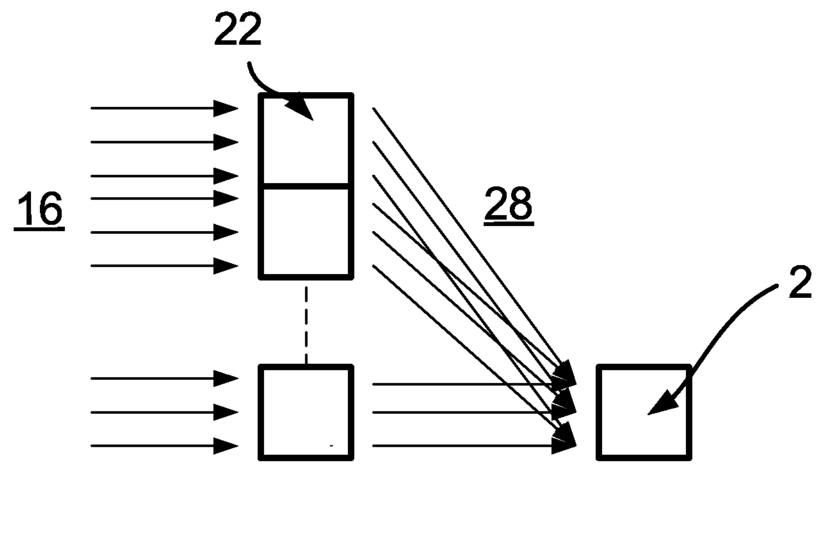
FIG. 10 shows a plurality of sub-arrays of a window, and a receiver node according to an embodiment of this disclosure.

As shown in FIG. 10, the combined sub-arrays can provide the lens operation. FIG. 10 also shows how the size of each sub-array 22 may be matched to (or made smaller than) the size of the receive antenna of the receiver node 2.

Figure 11A:
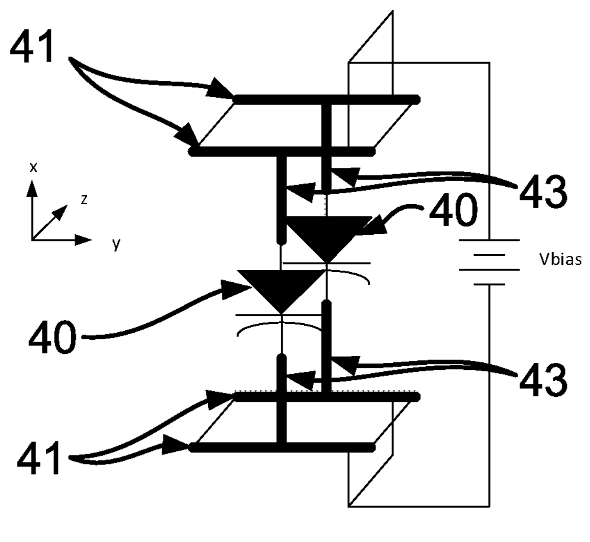
FIG. 11A shows an element of a sub-array according to an embodiment of this disclosure.
Figure 11B:
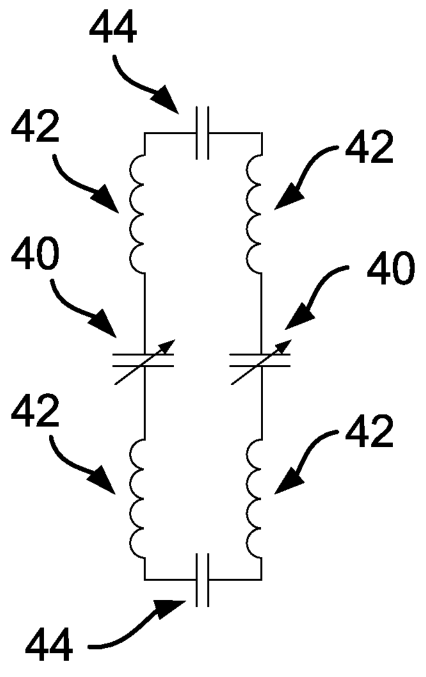
FIG. 11B shows an equivalent circuit of the arrangement of FIG. 11A according to an embodiment of this disclosure.

FIG. 11A shows an element 20 of a sub-array 22 of the kind described above according to an embodiment of this disclosure. FIG. 11B shows an equivalent circuit of the arrangement of FIG. 11A according to an embodiment of this disclosure.

In some embodiments, the elements may be passive elements, which refract the electromagnetic radiation be a fixed amount for focusing the electromagnetic radiation on a fixed location. However, as shown in FIGS. 11A and 11B, in some embodiments at least some of the elements may be active elements in the sense that they support tunability of the refraction angle that the produce. This can allow the focus point provided by the barrier and elements to be tuned, offering the user more flexibility with respect to the location of the receive antenna of the receiver node 2.

To support this tunability, each element 20 may include one or more microwave varactors 40. The varactors 40 may be used to tune the capacitance across pairs of capacitor plates 41 of the element 20, thereby to alter the refraction angle produced by that particular element 20. A controller may be provided for controlling the varactor(s) 40 of each respective element 20 in the barrier 10, collectively to cause the elements 20 to focus the electromagnetic radiation on a desired location in the customer premises. The capacitor plates 41 may, in some examples, be provided on opposite sides of the barrier (e.g. on opposite surfaces of a glass pane 30 of a window). In the embodiment shown in FIG. 11A, each element comprises two microwave varactors 40 connected between pairs of capacitor plates 41, via inductive connections 43. A bias voltage $V_{bias}$ and be applied across each capacitor plate 41 pair. Again, the bias voltage $V_{bias}$ for each element 20 may be tunably controlled by the aforementioned controller. An equivalent circuit of the arrangement of FIG. 11A is shown in FIG. 11B, according to an embodiment of this disclosure. In FIG. 11B, the capacitors 44 correspond to the capacitor plates 41 shown in FIG. 11A, while the inductors 42 correspond to the inductive connections 43. As can be seen in FIG. 11B, each varactor may be coupled in series with the inductors 42.

Implementation of the resonant cells can be done using various materials including etched PCB with soldered discrete varactors mounted to a PCB or on a Transparent Conducting Film (TCF).

Accordingly, there has been described a wireless communication system and method. The system comprises user equipment comprising a receive antenna for receiving mmWave signals from a base station transmitter. The system also includes a barrier configured to focus electromagnetic radiation carrying the mmWave signals onto the receive antenna of the user equipment.

Although particular embodiments of this disclosure have been described, it will be appreciated that many modifications/additions and/or substitutions may be made within the scope of the claims.

The invention claimed is:

1. A wireless communication system comprising:

user equipment comprising a receive antenna for receiving mmWave signals from a base station transmitter; and a barrier comprising an array of elements configured to focus electromagnetic radiation carrying said mmWave signals onto the receive antenna of the user equipment, wherein each element is configured to refract the electromagnetic radiation carrying said mmWave signals by a respective angle, different from all other respective angles of the elements of the array, to collectively focus the electromagnetic radiation carrying said mmWave signals, wherein each element of the array of elements comprises a sub-array of elements, wherein each element of the sub-array of elements provides a diffraction in a single direction corresponding to the respective angle of the element of the array which contains the sub-array of elements.

2. The wireless communication system of claim 1, wherein the barrier comprises a window for a building.

3. The wireless communication system of claim 1, wherein:

the barrier comprises a window for a building; and at least some of the elements are located on a surface of the window.

4. The wireless communication system of claim 1, wherein at least some of the elements are active elements.

5. The wireless communication system of claim 4, wherein the active elements comprise a varactor for tuning a refraction angle applied by each active element to the electromagnetic radiation carrying said mmWave signals.

6. The wireless communication system of claim 1, wherein a surface area of the barrier is larger than a surface area of the receive antenna of the user equipment.

7. The wireless communication system of claim 1, wherein the user equipment comprises a fixed wireless access modem.

8. The wireless communication system of claim 1, wherein the user equipment comprises a mobile communications device.

9. The wireless communication system of claim 1, further comprising said base station transmitter.

10. A wireless communication method comprising:

providing user equipment comprising a receive antenna;

providing a barrier configured to focus electromagnetic radiation carrying mmWave signals onto the receive antenna of the user equipment; and receiving mmWave signals at the user equipment by using the barrier to focus electromagnetic radiation carrying the mmWave signals onto the receive antenna of the user equipment, wherein the electromagnetic radiation carrying the mmWave signals is transmitted by a base station, wherein the barrier includes an array of elements, each configured to refract the electromagnetic radiation carrying said mmWave signals by a respective angle, different from all other respective angles of the elements of the array, to collectively focus the electromagnetic radiation carrying said mmWave signals, wherein each element of the array of elements comprises a sub-array of elements, wherein each element of the sub-array of elements provides a diffraction in a single direction corresponding to the respective angle of the element of the array which contains the sub-array of elements.

11. The wireless communication method of claim 10, wherein the barrier comprises a window, and wherein at least some of the elements are located on a surface of the window.

12. The wireless communication method of claim 10, wherein at least some of the elements are active elements including a varactor, and wherein the method further comprises using the varactor of each element to tune the respective angle applied by each active element to the electromagnetic radiation carrying said mmWave signals.

13. A wireless communication system comprising:

a barrier comprising an array of elements configured to focus electromagnetic radiation carrying said mmWave signals from a base station transmitter onto a receive antenna of user equipment, wherein each element is configured to refract the electromagnetic radiation carrying said mmWave signals by a respective angle, different from all other respective angles of the elements of the array, to collectively focus the electromagnetic radiation carrying said mmWave signals, wherein each element of the array of elements comprises a sub-array of elements, wherein each element of the sub-array of elements provides a diffraction in a single direction corresponding to the respective angle of the element of the array which contains the sub-array of elements.

14. The wireless communication system of claim 13, wherein the barrier comprises a window for a building.

15. The wireless communication system of claim 14, wherein at least some of the elements are located on a surface of the window.

16. The wireless communication system of claim 13, wherein the active elements comprise a varactor for tuning a refraction angle applied by each active element to the electromagnetic radiation carrying said mmWave signals.

* * * * *